Figures 1, 2:
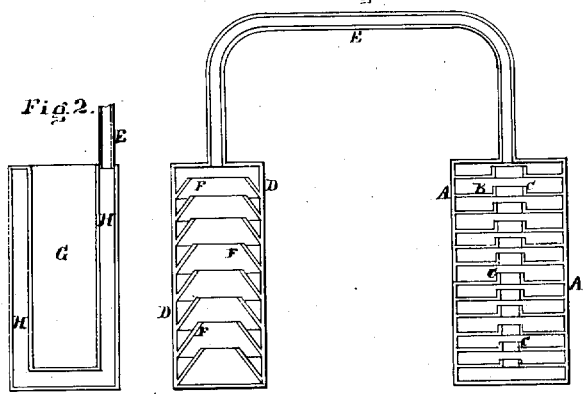

F. P. E. CARRE.

Ice-Machines.

No. 5,287.

Reissued Feb. 18, 1873.

Witnesses
George E. Buckley
George W. Pattison

Inventor
Ferdinand Philippe Edouard Carré
Jean Baptiste Java Mignon
Henri Stanislas Rouart per Lymp Harding
atty.

UNITED STATES PATENT OFFICE.

FERDINAND PHILIPPE EDOUARD CARRÉ, OF ST. PIERRE LES NEMOURS, ASSIGNOR OF PART INTEREST TO JEAN B. J. MIGNON AND HENRI S. ROUART, OF PARIS, FRANCE.

IMPROVEMENT IN ICE-MACHINES.

Specification forming part of Letters Patent No. 30,201, dated October 2, 1860; reissue No. 5,287, dated February 18, 1873.

DIVISION A.

*To all whom it may concern:*

Be it known that FERDINAND PHILIPPE EDOUARD CARRÉ, of St. Pierre les Nemours, (Seine-et-Marne,) France, did invent a certain new and Improved Apparatus for the Artificial Production of Ice and Cold; and that the following is a full, clear, and exact description of the same, reference being had to the annexed drawing making part hereof, in which—

Figure 1 is a vertical cross-section of the apparatus; Fig. 2, a similar view of a freezing-chamber, which may be substituted for D of Fig. 1.

The invention consists of an apparatus for the practical production of ice and cold; and is formed of two chambers or recipients, connected by a pipe or pipes—one chamber to contain an absorbent capable of holding a volatile gas, the other being a liquefying-chamber into which the gas is driven to be condensed or liquefied. The chamber containing the absorbent is heated to drive off the gas from the absorbent, which gas is conducted through a pipe or pipes to the other chamber, where it is condensed and liquefied by its own pressure, and by having been properly cooled, then suddenly again volatilized, producing great cold and reabsorbed by the absorbent, which has been suitably cooled, in the first chamber, from which it is to be again driven forth.

To enable others skilled in the art to make and use the invention, its construction and operation are described as follows:

A, Fig. 1, is the recipient containing the absorbent. B are disks filling up the interior, each having an opening with flange, C, in the middle. D is the recipient into which the gases or vapors flow to be liquefied. E is a connecting-pipe. F are disks, each in the shape of the convex surface of the frustum of a cone, each fastened all around the lower edge to the inside of the recipient D, having openings in the middle, thus forming shelves on the inside of the recipient D. G, Fig. 2, is an inner chamber, surrounded with an annular chamber, H, the latter connecting with pipe E, when the recipient, Fig. 2, is substituted for recipient D, Fig. 1.

The absorbent, for which water is preferred, is in recipient A, on disks B, kept in place by flanges C. This absorbent contains gas—ammonia preferred. Recipient A is heated sufficiently to drive off the gas, but not enough to vaporize the absorbent itself; and this operation is facilitated by the number of shelves or disks B containing the absorbent, thus allowing it to be easily and quickly heated. The gas, after separating from the absorbent, passes through the pipe E into the liquefying-chamber or recipient D, where, in consequence of the pressure of the incoming gas, and assisted by the water surrounding the recipient, which extracts from the gas its latent heat, it becomes liquefied and falls on shelves F. The heating of the recipient A is then stopped, thus relieving the pressure on the liquefied gas. The water which has been used to assist in the liquefaction of the gas is then removed. This, coupled with the relief of the pressure, induces the volatilization of the liquefied gas. This volatilized gas now extracts the heat from whatever liquid surrounds recipient D, or is in chamber G, and freezes it. Fig. 2 may be substituted for D, Fig. 1. The gas is liquefied and volatilized in chamber H, freezing whatever is contained in G.

When the heating of recipient A is stopped, a partial or relative vacuum is formed in the space between the absorbent and the liquefied gas, assisting in the volatilization of the latter.

The disks F, if desired, may be dispensed with, as the operation can be carried on without them.

If desired, a stop-cock may be employed in connection with pipe or tube E, to stop the operation at the will of the operator.

Having thus described the invention, what is claimed as new, and desired to be secured by Letters Patent, is—

1. An apparatus for the practical production of ice and cold, consisting of two chambers, one for separating the gas from the absorbent containing it, and the other for condensing it, connected by a tube, E, or its equivalent, substantially as described.

2. In an apparatus for the practical production of ice and cold, chamber A, having internal disks B and flanges C, substantially as described.

FERDINAND PHILIPPE EDOUARD CARRÉ.
JEAN BAPTISTE JAVA MIGNON.
HENRI STANISLAS ROUART.

Witnesses as to signature of F. P. E. CARRÉ:
F. OLCOTT,
M. J. BUJAC.

Witnesses as to signatures of J. B. J. MIGNON and H. S. ROUART:
E. AUBERT,
L. LE BOULLEUD DE COURLAY.